United States Patent Office 2,777,324
Patented Jan. 15, 1957

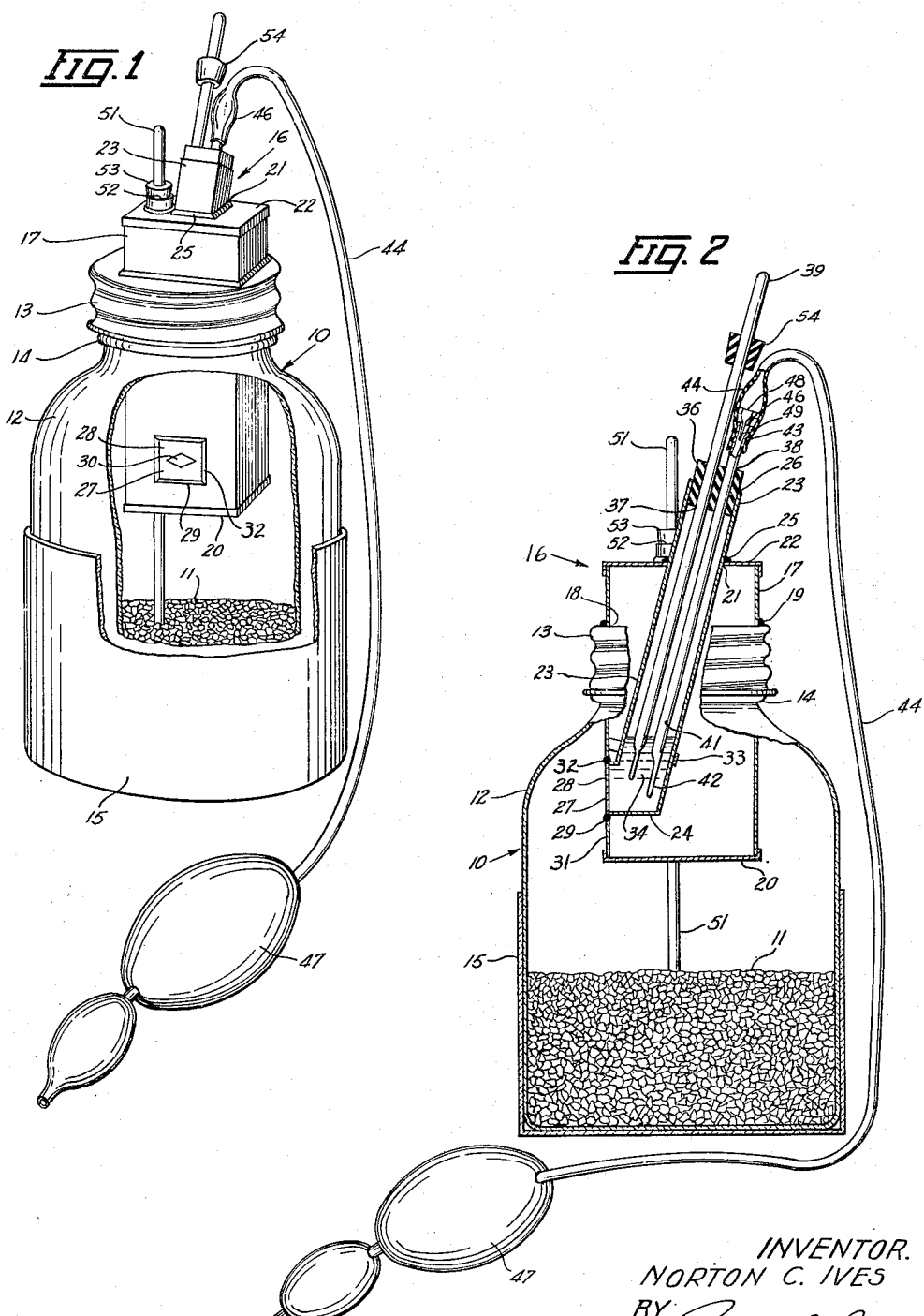

2,777,324

APPARATUS FOR DETERMINING THE STORAGE QUALITY OF GRAIN

Norton Conrad Ives, San Jose, Costa Rica

Application January 21, 1953, Serial No. 332,305

2 Claims. (Cl. 73—73)

This invention relates generally to grain testing apparatus and more particularly to apparatus for determining the moisture content of grain for storage purposes.

It is well known that mold and insects cause deterioration and loss of large quantities of grain, when stored in enclosed bins under improper moisture conditions. Furthermore, it is known that the ability of mold and insects to develop on such grain is dependent on the relative humidity of the interstitial air which surrounds the grain particles, so that the mold and insect resistant quality of the grain and therefore the storage quality of the grain is dependent on the relative humidity of the interstitial air. For example, it has been found that stored grain which maintains an interseed or ambient atmosphere at a relative humidity above 75% will mold within a matter of days and that a relative humidity below 65% is necessary to control all the important damage-producing molds. A relative humidity condition in the region of 35% or below will practically prevent both mold and insect development in stored grain.

Thus, it is not necessary to know the actual water content of the grain to predict its storabiilty. The relative humidity of the interstitial air directly indicates the ability of any grain mold to proliferate. Accordingly, the apparatus of this invention provides for measuring the dew point and dry bulb temperature of an enclosed grain-air mixture, and thereby the relative humidity of the interstitial or ambient air of the grain. To determine these temperatures, a grain-air mixture is allowed to come to equilibrium in a closed jar with dew point apparatus inserted. The dew point temperature of the air is then determined along with the temperature of the grain. The difference between these two temperatures is called the "dew point depression," which in turn gives the relative humidity of the interstitial air. For example, a dew point depression of 5° C. indicates that the relative humidity of the interstitial air is about 74% such that a grain will keep only a matter of days while a depression of 8° C. indicates a relative humidity of about 60% so that the grain is safe for long-time storage. This amount of dew point depression, namely 8° C., corresponds approximately to a grain moisture content of 13 percent in shelled corn; 12.5% in barley and rough rice; 11.8% in oats; 9.6% in soybeans and 8% in flax. Research and practice have shown these moisture contents to be on the safe side for long time storage of the grain.

An object of this invention is to provide an improved apparatus for testing the storage quality of grain.

A further object of this invention is to provide an apparatus for accurately determining the dew point temperature of an enclosed non-circulating air or gas.

A further object of this invention is to provide an apparatus for testing the storage quality of grain which is economical to manufacture, simple in construction, and easily operated by an inexperienced operator to give accurate results.

Further objects, features and advantages of this invention will become apparent from a consideration of the following description when taken in connection with the accompanying drawing in which:

Fig. 1 is a perspective view of the grain testing apparatus of this invention with parts broken away to more clearly show its construction; and Fig. 2 is a longitudinal sectional view of the testing apparatus with certain parts removed and other parts shown in section for the purpose of clarity.

With reference to the drawing, the grain testing apparatus of this invention, indicated generally at 10, is shown assembled for determining the storage quality of a grain sample 11. The apparatus 10 consists generally of an ordinary wide-mouth glass fruit jar or container 12 for holding the grain sample 11 and provided with a usual cap or cover 13 threadably mounted on the neck end 14 of the jar 12. Secured to and extended through the cover 13 so as to project downwardly into the jar 12, is a hygrometer unit indicated generally at 16. Positioned about the bottom of the jar 12 is an insulating shell 15 for minimizing the effect of the air externally of the jar 12 on the temperature of the grain sample 11 in the jar.

The hygrometer unit 16 includes an upright casing 17 of a generally rectangular shape extended through a corresponding rectangular opening 18 formed in the jar cap 13. The casing 17 is closed at its top and bottom ends by plates 22 and 20, respectively, and is secured intermediate its ends to the cap 13 as by welding 19 extended around the periphery of the casing 17. A substantially square opening 21 is formed in the top plate 22 of the casing 17 for receiving an enlongated container 23 positioned within the casing 17 and welded intermediate its ends, as at 25, to the plate 22. The container 23 is substantially square in transverse cross-section and is provided with an open upper end 26 and a laterally extended lower end section 24. The terminal end of the section 24 is closed by a metal plate 27 having an outer surface 28 which is preferably coated with chromium or the like and highly polished to add to its brightness.

For a purpose to appear later, the outer surface 28 is provided in the following manner with a geometrical design such as a diamond 30 (Fig. 1). A tape mask having a cut-out portion corresponding to the shape of the diamond 30 is placed on the outer surface 28 and a layer of household cement or wax applied to the exposed diamond shaped area 30 on the surface 28. The cement or wax is then allowed to dry and the mask is removed. The area 30 is then polished with soft paper or frayed linen so that the diamond is no longer visible. However, a thin film of wax or oil corresponding to the diamond 30 remains on the surface 28 even though such film is not visible at temperatures considerably above the dew point. However, this film of wax or oil will whiten at temperatures near to the dew point temperature. Thus the diamond 30, if kept properly cleaned, will "whiten" at or very near to the initial point of condensation in contrast to the surrounding area on the surface 28. If dimmed, the diamond 30 can readily be renewed by merely polishing with acetone or the like.

The plate 27 is positioned in an opening 29, of a size slightly larger than the size of the plate 27, formed in what shall for convenience be hereinafter referred to as the front wall 31 of the casing 17. A metal strap 33 is positioned about the container 23 and attached at its ends to the front wall 31 for holding the polished plate 27 in position in the opening 29. A strip of insulating material 32 is secured to and extended between the edges of the plate 27 and the opening 29 for securing the plate 27 to the front wall 31 and for preventing any heat transfer between the plate 27 and the wall 31. The container 23 is partially filled with a highly volatile liquid refrigerant 34 such as ether or acetone to a level above the top end of the polished plate 27.

Pressed into the open end 26 of the container 23 is a cork or rubber stopper 36 having a pair of substantially parallel openings 37 and 38 extended therethrough. Positioned in the opening 37 is a glass thermometer 39 of a length such that it extends into the refrigerant 34 and provided adjacent its upper end with a cork 54 to facilitate handling of the thermometer 39. A glass tube 41 having a lower reduced end portion 42 is positioned in the opening 38 so that the end 42 extends beneath the level of the refrigerant 34. One end 43 of a flexible tube 44 is positioned about the open upper end 46 of the glass tube 41 while the other end of the tube 44 is secured to an air aspirating bulb 47. Mounted in the tube 44 adjacent the end 43 thereof, is a small bore hollow needle 48 which constitutes an aspirating air-metering orifice. The needle 48 is arranged so that its outlet end 49 projects into the end 46 of the tube 41.

A glass thermometer 51 is positioned in the casing 17 with its lower end extended through the bottom plate 20 of the casing 17 and positioned in the grain sample 11. For preventing any heat transfer between the grain 11 and the air outside the jar 12, the thermometer 51 is provided adjacent its upper end with a cork 53 positioned within an opening 52 formed in the upper end of the casing 17.

In the use of the apparatus 10 for determining the storage quality of a grain, the jar cap 13 and its associated hygrometer unit 16 and thermometer 51 are removed from the jar 12, which is then partially filled, as shown in Figs. 1 and 2, with grain 11 the storage quality of which is to be determined. A conventional jar cap (not shown) is then positioned on the top end 14 of the jar 12 so that the jar is closed. It is now essential that the moisture in the grain 11 and in the air in the jar 12 reach an equilibrium condition. If the grain 11 is left in the jar 12 for a period of ten hours or more, this equilibrium condition is achieved without any mechanical mixing of the grain and air.

However, if a quick test of the grain is required, the operator should thoroughly shake the jar 12 and its contents, taking care to grasp the jar 12 by its cover and insulating shell 15 so as not to raise the temperature of the jar 12 due to its contact with the operator's hand.

When the moisture of the grain 11 and the air in the jar 12 are in equilibrium, the conventional jar cap (not shown) is removed and the cap 13, together with the hygrometer unit 16 and thermometer 51, quickly installed on the jar 12 as shown in Figs. 1 and 2. By manipulating the bulb 47, air is directed through the tube 44, needle 48 and glass tube 41 for aspiration through the refrigerant 34 to thereby lower the temperature of the plate 27. By virtue of the small bore of the needle 48, the air supply to the refrigerant 34 can be closely controlled to in turn provide for a gradual controlled decrease in the refrigerant temperature.

Concurrently with the bubbling or aspirating of air through the refrigerant 34, the operator observes the outer surface 28 of the plate 27. When the dew point temperature of the air in the jar 12 is reached, the diamond 30 immediately becomes visible and distinguishable from the other parts of the surface 28, since the diamond 30 "whitens" or becomes cloudy the instant condensation forms on the surface 28. At this instant of "whitening" of the diamond 30, the operator observes the temperature indicated by the thermometer 39. The temperature of the grain sample 11 is then determined by either observing the temperature of the thermometer 51 through the glass container 12 or by grasping the cork 53 and removing the thermometer 51 for convenient reading.

The degree of difference between these two temperatures observed on the thermometers 39 and 51, is called the "dew point depression" and is an indication of the storage quality of the grain 11. As previously mentioned a "dew point depression" of less than 5° C. indicates that a grain will keep only a matter of days while a depression of 8° C. indicates that the grain is safe for long-time storage. Thus, since the temperature of a grain safe for storage is always greater than the dew point temperature recorded on the thermometer 39, the lower the temperature of the plate 27 required for "whitening" of the diamond 30 the greater the factor of safety for storing of the grain 11. This result follows because a low dew point for the atmosphere in the jar 12 relative to the grain temperature indicates a low relative humidity of such atmosphere which indicates the grain to be in the safe storage moisture range.

For greater accuracy, the thermometer 51 should be brought to the estimated temperature of the grain 11 before insertion in the jar 12. In addition, the dew point of the air in the jar 12 can be more accurately determined if the operator runs a first trial test in which he notes the approximate temperature at which the diamond 30 becomes distinguishable. The refrigerant 34 is then replaced by warm water to warm the plate 27, after which the container 23 is again partially filled with refrigerant 34 and the dew point more accurately determined since the operator knows at about what temperature the diamond 30 will appear.

From the foregoing description, it is seen, that a simple and inexpensive apparatus 10 has been provided which can readily be manipulated by an inexperienced operator for quickly determining the storage quality of grain according to the method of this invention. The hygrometer unit 16, including the polished surface 28 and diamond 30 thus provides for the accurate determination of the dew point of an atmosphere for use in the calculation of the storage quality of a grain. The dew point depression directly indicates the relative humidity of a given water-vapor condition in an air and water-vapor mixture. Therefore, the degrees depression directly indicates the moisture condition of a grain-air or other material mixture. Experience with the apparatus of this invention indicates that accuracy in field usage may be held easily to within one-half of one degree depression, or if the grain samples are placed in containers overnight before being tested, accuracy can be held to within one-fourth of one degree. In the storage moisture range, this is less than one-fourth of one percent of grain moisture content.

Although the invention has been described with respect to a preferred embodiment thereof, it is to be understood that the invention is not to be so limited since changes can be made therein which are within the scope of the appended claims.

I claim:

1. Apparatus for determining the storage quality of grain comprising a closed container adapted to be partially filled with grain, means extending into said container for recording the temperature of the grain in the container, a metal plate having a pair of faces and supported in said container so that one of said faces is disposed adjacent one of the walls of said container, means in contact with the other of said faces for progressively lowering the temperature of said plate, said one of said faces being shiny and having a thin film of wax applied to a portion thereof, with said waxed portion of said one face being immediately visually distinguishable from the unwaxed portion of said one face when the temperature of said plate has been lowered to the dew point temperature of the air in said container and means operatively associated with said plate for measuring the temperature thereof.

2. Apparatus for determining the moisture condition of grain comprising a first closed container adapted to be partially filled with grain, said container having an upright wall with a portion of said wall being transparent, a second container positioned in said first container and having one end thereof closed by a plate member having a pair of faces, with one of said faces being disposed adjacent the transparent portion of said wall so as to be visible through said wall, a liquid refrigerant positioned in said second container so as to be in contact with the other one of said plate member faces, means for progressively lowering the temperature of said refrigerant, a thermometer in said first container for determining the temperature of the grain therein, and a thermometer in said second container for determining the temperature of said refrigerant, with the appearance of moisture on said one face indicating that the temperature of the refrigerant has been lowered to the dew point temperature of the air in the container.

References Cited in the file of this patent

UNITED STATES PATENTS

| | | |
|---|---|---|
| 1,883,116 | Tomlinson | Oct. 18, 1932 |
| 2,459,810 | Graves et al. | Jan. 25, 1949 |
| 2,697,933 | Donath | Dec. 28, 1954 |

FOREIGN PATENTS

| | | |
|---|---|---|
| 634,285 | Great Britain | Mar. 15, 1950 |

OTHER REFERENCES

Article "A new method for moisture testing," by S. T. Dexter, published in Baker's Digest, October, 1949. (Copy in Div. 36.)